A. S. Johnson,
Bee Hive.
No. 83,388.  Patented Oct. 27, 1868.
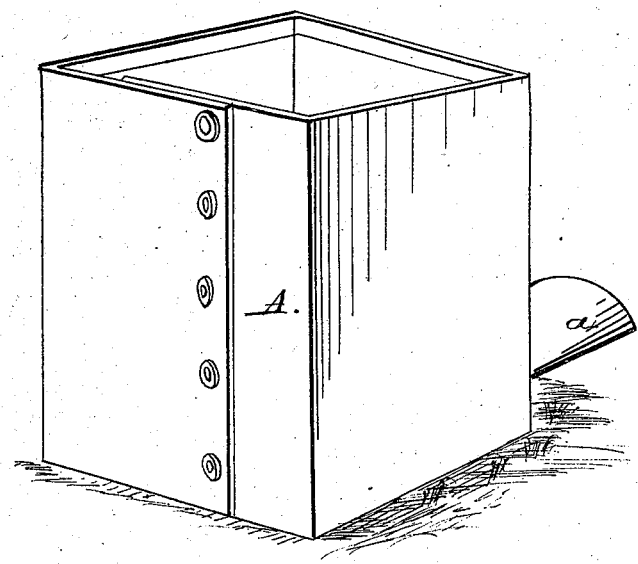
WITNESSES:
Wm A. Morgan
G. C. Cotton
INVENTOR:
A. S. Johnson
per Munn & Co.
Attorneys.

United States Patent Office.

ALFRED S. JOHNSON, OF WAUPUN, WISCONSIN, ASSIGNOR TO HIMSELF AND LYMAN B. BALCOM, OF SAME PLACE.

Letters Patent No. 83,388, dated October 27, 1868.

IMPROVEMENT IN BEE-HIVE PROTECTORS.

The Schedule referred to in these Letters Patent and making part of the same.

*To all whom it may concern:*

Be it known that I, ALBERT S. JOHNSON, of Waupun, in the county of Fond-du-Lac, and State of Wisconsin, have invented a new and useful Improvement in Bee-Hive Protectors; and I do hereby declare that the following is a full, clear, and exact description thereof, which will enable others skilled in the art to make and use the same, reference being had to the accompanying drawings, forming part of this specification, in which the drawing represents a perspective view of my invention.

Similar letters of reference indicate like parts.

This invention relates to a simple and economical device for protecting bee-hives from the cold of winter and the heat of summer.

Various plans have been devised to effect this result, some of which have been attended with great expense in the construction or manufacture, and others quite inefficient, on account of the difficulty of applying them.

My invention consists in constructing a box or case of paper, formed of one or more thicknesses, and covered or coated with any suitable paint or varnish, to render it water-proof. This box or case is provided with a shield, to cover the bee-entrance of the hive, over which the case is placed, the shield being designed to prevent the entrance of the sun into the hive through the bee-entrance.

A represents a box or case, constructed of one or more thicknesses of paper, or *papier-maché*, which substances are non-conductors, and form a very efficient shield against extremes of temperature.

This box or case is made of a form and size corresponding with the hive, so that the former may be fitted over the latter, and removed therefrom, without any trouble or difficulty whatever.

The box or case may be secured in position by strings or other suitable fastenings, and a shield or projection, *a*, of any suitable material, extends from one side of the box or case, in order to prevent the sun from striking into the bee-entrance.

This device may be constructed by almost any one, at a very small cost, and it possesses the advantage of being capable of being applied to the hives where they stand permanently, and without moving or disturbing them in the least.

The shield or projection *a*, by preventing the rays of the sun penetrating the hive, will cause the bees to remain in the hive in winter.

Bees have never been known to leave a hive in winter, when the temperature without is too low, except allured out by the penetration of the sun into the hive, and this the shield effectually prevents.

Having thus described my invention,

I claim as new, and desire to secure by Letters Patent—

1. The casing or box A, composed of paper or *papier-maché*, for encasing a bee-hive, substantially as herein shown and described.

2. The shield or projection *a*, attached to the case, covering, or box, substantially as and for the purpose specified.

The above specification of my invention signed by me, this      day of      , 1868.

ALFRED S. JOHNSON.

Witnesses:
J. N. ACKERMAN,
LEWIS SILBER.